United States Patent Office 3,436,396
Patented Apr. 1, 1969

3,436,396
1,4 AND 1,5-BIS[γ-HYDROXY-γ,γ-DI-(2-PYRIDYL-METHYL)] - 5 - NORBORNENE - 2,3 - DICARBOXIMIDE AND DERIVATIVES THEREOF
Joseph Albert Meschino, North Wales, Richard Joseph Mohrbacher, Fort Washington, Chris Royce Rasmussen, Ambler, and James Nelson Plampin, Roslyn, Pa., assignors to McNeil Laboratories, Inc., a corporation of Pennsylvania
No Drawing. Continuation-in-part of application Ser. No. 563,684, July 6, 1966. This application Apr. 19, 1967, Ser. No. 631,900
Int. Cl. C07d 27/28, 27/54, 31/44
U.S. Cl. 260—295         7 Claims

ABSTRACT OF THE DISCLOSURE

The compounds are of the class of 5-norbornene-2,3-dicarboximides which are useful for their central nervous system depressant activity.

---

This is a continuation-in-part application of our co-pending application, Ser. No. 563,684, filed July 8, 1966.

This invention relates to novel organic chemical compounds and, more particularly, to novel 5-norbornene-2,3-dicarboximides which may be structurally represented by the following formulas:

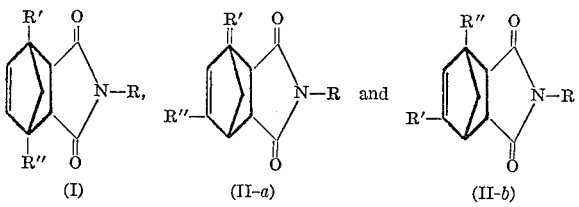

(I)         (II-a)         (II-b)

wherein R is a member selected from the group consisting of hydrogen, lower alkyl, aralkyl, dialkylaminoalkyl and aryl; R' is an $R_1R_2C(OH)$— group and R'' is an $R_3R_4C(OH)$— group in which each of $R_1$, $R_2$, $R_3$ and $R_4$ are the same or different member selected from the group consisting of aryl, preferably phenyl and substituted phenyl in which the substituent is one or more of lower alkyl, lower alkoxy, halo, nitro, di-(lower alkyl)amino or trifluoromethyl, and heteroaryl, preferably pyridyl and quinolyl and such heteroaryl bearing a lower alkyl substituent; provided that at least one of said $R_1$, $R_2$, $R_3$ and $R_4$ is an electron-withdrawing aryl or heteroaryl group such as, for example, pyridyl, quinolyl and nitrophenyl. The subject compounds include the 1,4-isomers of Formula I which may be denoted as 1-($R_1$-$R_2$-hydroxymethyl) - 4 - ($R_3$-$R_4$ - hydroxymethyl)-N-R-5-norbornene-2,3-dicarboximides; and the 1,5-isomers of Formula II–a which may be denoted as 1-($R_1$-$R_2$-hydroxymethyl)-5-($R_3$ - $R_4$ - hydroxymethyl) - N - R - 5-norbornene-2,3-dicarboximides; and of Formula II–b which may be denoted as 1 - ($R_3$-$R_4$-hydroxymethyl)-5-($R_1$-$R_2$-hydroxymethyl)-N-R-5-norbornene-2,3-dicarboximides.

As used here, lower alkyl and lower alkoxy include straight or branched saturated aliphatic chains, such as, for example, methyl, ethyl, propyl, isopropyl, butyl, isobutyl, secondary-butyl, pentyl and the like, and, respectivey, methoxy, ethoxy, propoxy, etc.; and halo includes chloro, bromo, fluoro and iodo.

The subject compounds may be prepared by condensation of an appropriate R'-R''-cyclopentadiene and maleimide or, for preparation of the N-alkyl, N-aralkyl and N-aryl derivatives of this invention, an N-alkyl, N-aralkyl and N-aryl substituted maleimide, respectively, under Diels-Alder condiitons. N-alkyl, N-aralkyl and N-aryl maleimides are generalyl prepared by reaction of maleic anhydride with an appropriate alkylamine, aralkylamine or arylamine followed by dehydration of the resulting N-substituted maleamic acid.

An alternative method of preparing the N-alkyl derivatives of this invention, and the N-dialkylaminoalkyl derivatives also, is by introduction of the alkyl or dialkylaminoalkyl group onto the unsubstituted imido nitrogen of the subject 1,4- and 1,5-disubstituted 5-norbornene-2,3-dicarboximides by conventional alkylation with, respectively, an appropriate lower alkyl halide, e.g., methyl iodide, ethyl bromide, butyl bromide and the like, or a dialkylaminoalky halide, e.g., dimethylaminopropyl chloride, diethylaminoethyl chloride and the like. The alkylation may be carried out in a variety of polar or nonpolar solvents such as the lower alkanols, e.g., methanol, ethanol, isopropanol and the like; ethers; dimethylformamide; or aromatic hydrocarbons such as benzene, toluene, xylene and the like. The alkylation may also be carried out in the presence of an alkali or alkaline earth metal hydroxide or alkoxide.

The cyclopentadiene starting materials may be broadly designated as 1 - ($R_1$ - $R_2$ - hydroxymethyl) - 4 - ($R_3$-$R_4$ hydroxymethyl) - cyclopenta - 1,3 - dienes and 1-($R_1$-$R_2$-hydroxymethyl) - 3 - ($R_3$-$R_4$-hydroxymethyl)-cyclopenta-1,3-dienes. They may be advantageously prepared by reacting an appropriate $R_1$—CO—$R_2$ ketone with a cyclopentadienyl Grignard reagent, e.g., a cyclopentadienyl magnesium halide such as cyclopentadienyl magnesium bromide or chloride in a nonhydroxylic solvent, preferably at reduced temperatures to produce the corresponding cyclouentadienyl $R_1$-$R_2$-methanol which, in turn, is treated with an appropriate $R_3$—CO—$R_4$ ketone, which ketone may be the same as or different from the $R_1$—CO—$R_2$ ketone, in the presence of a base, such as an alkali metal lower alkoxide, in a lower alkanol solvent. In place of the cyclopentadienyl Grignard reagent, a cyclopentadienyl alkali metal, e.g., cyclopentadienyl lithium or cyclopentadienyl sodium, may be employed. Typical nonhydroxylic solvents are ethers such as diethyl ether, tetrahydrofuran, ethylene glycol dimethyl ether, and the like; aromatic hydrocarbons such as benzene, toluene, xylene and the like; aliphatic hydrocarbons such as hexane, heptane and the like; alicyclic hydrocarbons such as methylcyclohexane; and mixtures of such aromatic, aliphatic and alicyclic hydrocarbons. A catalytic amount of the alkali metal lower alkoxide is generally all that is required, although from 0.01 to 0.1 mole of alkoxide per mole of ketonic reagent is preferred and up to 0.5 mole may be advantageously employed. The preferred alkoxide and lower alkanol are sodium ethoxide and ethanol, respectively. Allowable temperatures for the above reactions may range from —30° C. to +30° C.

In those cases where R' and R'' are different in the R'-R''-cyclopentadiene starting material, the resulting 1,5-disubstituted 5-norbornene-2,3-dicarboximides can exist in the following two forms:

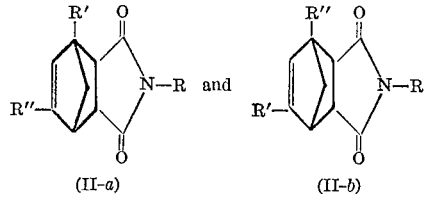

(II-a)         (II-b)

An alternative method of preparing those R'-R''-cyclopentadiene starting materials wherein R' and R'' are the same Pyr-Pyr*-hydroxymethyl substituent, said Pyr and Pyr* each being a member selected from the group consisting of pyridyl and lower alkyl-pyridyl, is by treating an appropriate Pyr-CO-Pyr* ketone with cyclopentadiene, preferably in the ratio of 2 moles of ketone to 1 mole of cyclopentadiene, under the previously described reaction conditions except that temperatures ranging from about −15° C. to about 10° C. are preferred.

Due to the known double bond isomerization of the cyclopentadienyl ring nucleus in substituted cyclopentadienes, its is evident that the existence of the di-substituted cyclopentadiene starting materials as more than one double bond isomer is possible and, accordingly, the product obtained from the above-described reaction schemes result in a mixture of double-bond isomers of R'-R''-cyclopentadiene which, as evidenced by nuclear magnetic resonance (NMR) spectroscopy, generally comprises 1-($R_1$-$R_2$-hydroxymethyl) - 4 - ($R_3$-$R_4$ - hydroxymethyl) cyclopenta - 1,3 - diene and 1 - ($R_1$-$R_2$ - hydroxymethyl) 3 - ($R_3$-$R_4$ - hydroxymethyl)-cyclopenta - 1,3 - diene, which can generally be separated by conventional techniques such as fractional crystallizations, or which can be used as such in the subsequent maleimide condensation reaction.

The subject 1,4- and 1,5-disubstituted derivatives of N-R-5-norbornene-2,3-dicarboximide have useful pharmacological applications. For example, doses of about 100 mg./kg. of body weight administered intraperitoneally (i.p.) are sufficient to produce ataxia in mice, which responce is used as a measure of central nervous system depression. None of the subject compounds produce death at doses up to 1000 mg./kg. i.p. in mice.

The following examples are intended to illustrate, but not to limit, the scope of the present invention.

EXAMPLE I

A stirred solution of 18.4 grams of di-(2pyridyl) ketone in 150 ml. of absolute ethanol containing about 0.1 g. of sodium ethoxide is cooled to −10° C. and treated with 3.6 g. of cyclopentadiene so that the temperature does not exceed 0° C. After about 3 hours, the resulting precipitate is filtered and air-dried to give 20 g. of the isomeric mixture, M.P. 120–123° C. From nuclear magnetic resonance (NMR) spectroscopy, the mixture is found to be predominantly composed of 1,4 - di - [di - (2 - pyridyl)-hydroxymethyl]-cyclopenta-1,3-diene and 1,3-di-[di-(2-pyridyl)-hydroxymethyl]-cyclopenta-1,3-diene (3:1 ratio).

*Analysis.*—Calcd. for $C_{27}H_{22}N_4O_2$: C, 74.63; H, 5.10; N, 12.90%. Found: C, 74.57; H, 5.21; N, 12.77%.

EXAMPLE II 1,4-bis-(α-hydroxy-α,α-di-2 - pyridylmethyl) - 5 - norbornene-2,3-dicarboximide and 1,5 - bis(α-hydroxy-α,α-di-2-pyridyl methyl)-5-norbornene-2,3-dicarboximide A mixture of 5 g. of (0.012 mole) of the product obtained from Example I and 1.1 g. (0.012 mole) of maleimide in 25 ml. of benzene is stirred and refluxed for several hours. The resulting precipitate is collected by filtration and recrystallized from dimethylformamide-water to give the 1,4-isomer, M.P. 240° C. (dec.) as shown by nuclear magnetic resonance spectroscopy.

*Analysis.*—Calcd. for: $C_{31}H_{25}N_5O_4$: C, 70.04; H, 4.74; N, 13.18%. Found: C, 69.81; H, 4.94; N, 12.95%.

After several days, the mother liquors precipitate a second product which is freed from any 1,4-isomer by boiling in benzene and filtering. Upon concentrating the benzene filtrate, the 1,5-isomer is obtained by precipitation, M.P. 155–160° C.

*Analysis.*—Calcd. for $C_{31}H_{25}N_5O_4$: N, 13.18%. Found: N, 12.88%.

EXAMPLE III

N-ethyl-1,4-bis(α-hydroxy-α,α - di - 2 - pyridylmethyl)-5-norbornene-2,3-dicarboximide and N - ethyl - 1,5-bis(α-hydroxy-α,α-di-pyridylmethyl) - 5 - norbornene-2,3-dicarboximide The procedure of Example II is followed except that an equivalent quantity of N-ethyl maleimide is used in place of the maleimide used therein to yield a mixture of the corresponding N-ethyl 1,4-isomer and N-ethyl 1,5-isomer. The N-ethyl-1,4-isomer is obtained from the initial crystallization. Recrystallization from dimethylformamide gives a pure product, M.P. 241–243° C. (dec.), shown to be the N-ethyl-1,4-isomer by nuclear magnetic resonance spectroscopy.

*Analysis.*—Calcd. for $C_{33}H_{29}N_5O_4$: N, 12.52%. Found: N, 12.58%.

Thin layer chromatography using a methanol-dimethylformamide developer shows the presence of the N-ethyl-1,5-isomer in the mother liquors.

EXAMPLE IV

N-ethyl-1,5-bis(α-hydroxy-α,α-di-2-pyridylmethyl)-norbornene-2,3-dicarboximide

To a solution of 5.5 g. (0.24 g. atom) of sodium in 350 ml. of absolute ethanol is added 56.0 g. (0.1 mole) of 1,5-bis(α-hydroxy-α,α - 2 - pyridylmethyl)-5-norbornene-2,3-dicarboxamide. When solution is complete, 15 g. (0.14 mole) of ethyl bromide is added. After heating at reflux for about 24 hours, the mixture is filtered and the solvent removed by vacuum distillation leaving N-ethyl-1,5-bis-(α - hydroxy - α,α - di - 2 - pyridylmethyl) - 5 - norbornene-2,3-dicarboxamide in the residue.

EXAMPLE V

By using an equivalent quantity of di-(6-methyl-2-pyridyl) ketone for the di-(2-pyridyl) ketone in the procedure of Example I, an isomeric mixture of predominantly 1,4 - di - [di-(6-methyl-2-pyridyl)-hydroxymethyl]-cyclopenta-1,3-diene and 1,3-di-[di-(6-methyl-2-pyridyl)-hydroxymethyl] - cyclopenta - 1,3-diene is obtained, M.P. 147.5–149.5° C.

EXAMPLE VI 1,4-bis[α-hydroxy-α,α - di-(6-methyl-2-pyridyl) - methyl]-5-norbornene-2,3-dicarboximide and 1,5-bis[α-hydroxy-α,α-di-(6-methyl-2-pyridyl) - methyl] - 5 - norbornene-2,3-dicarboximide A mixture of 25 g. (0.051 mole) of the product obtained from Example V and 5 g. (0.052 mole) of maleimide in 250 ml. of benzene is refluxed for several hours. The solvent is then removed by distillation under reduced pressure and the resulting residue is triturated with diethyl ether. The resulting crystalline solid is collected by filtration and recrystallized from ethylacetate. The product is shown to be the 1,4-isomer by nuclear magnetic resonance (NMR) spectroscopy.

*Analysis.*—Calcd. for $C_{35}H_{33}N_5O_4$: N, 11.92%. Found: N, 11.81%.

After several days, the mother liquors precipitate a second product, M.P. 208–212° C., which is purified by boiling in ethyl acetate. The pure 1,5-isomer is obtained by filtration from the hot solution and melts at 210–212° C.

*Analysis.*—Calcd. for $C_{35}H_{33}N_5O_4$: N, 11.92%. Found: N, 11.68%.

EXAMPLE VII

N-ethyl-1,4-bis[α-hydroxy-α,α-di-(6-methyl - 2 - pyridyl)-methyl]-5-norbornene-2,3 - dicarboximide and N-ethyl-1,5-bis[α-hydroxy-α,α-di-(6-methyl - 2 - pyridyl)methyl]-5-norbornene-2,3-dicarboximide By following the procedure described in Example VI, except that an equivalent quantity of N-ethyl maleimide is used in place of the maleimide used therein, a mixture of the N-ethyl-1,4-isomer and N-ethyl-1,5-isomer is obtained. The N-ethyl-1,4-isomer is obtained from the first crystallization. Recrystallization from ethyl acetate gives the pure N-ethyl-1,4-isomer, M.P. 197–199° C.

*Analysis.*—Calcd. for $C_{37}H_{37}N_5O_4$: N, 11.38%. Found: N, 11.38%.

Thin layer chromatography of the mother liquors shows the presence of the N-ethyl-1,5-isomer.

EXAMPLE VIII

N-ethyl-1,5-bis[α-hydroxy-α,α-di-(6-methyl-2-pyridyl)-methyl]-5-norbornene-2,3-dicarboximide This product is obtained by following the alkylation procedure described in Example IV except that an equivalent quantity of 1,5-bis[α-hydroxy-α,α-di-(6 - methyl-2-pyridyl)methyl]-5-norbornene-2,3-dicarboxamide is used as the starting material.

EXAMPLE IX

By following the alkylation procedures of Examples IV and VIII, except that an equivalent quantity of n-butyl bromide is used as the alkylylating agent instead of ethyl bromide, there are obtained, as respective products, N-n-butyl-1,5-bis(α-hydroxy-α,α-di - 2 - pyridylmethyl)-5-norbornene-2,3-dicarboximide and N-n-butyl - 1,5 - bis[α-hydroxy-α,α-di-(6-methyl-2-pyridyl) - methyl]-5-norbornene-2,3-dicarboximide.

EXAMPLE X

To an ethereal solution of ethyl magnesium bromide prepared from 4.86 g. (0.2 g. atom) of magnesium and 25 g. (0.229 mole) of ethyl bromide is added 125 ml. of dry benzene. Ether is distilled until the boiling point of the mixture reaches 60–63° C. Then 13.2 g. (0.2 mole) of freshly distilled cyclopentadiene is added and the mixture is refluxed for six hours. The resultant cyclopentadienyl magnesium bromide solution is cooled under an atmosphere of dry nitrogen to below 0° C. and 36.4 g. (0.2 mole) of benzophenone in 100 ml. of ether is added with stirring. After stirring for an addition 30 min., the mixture is hydrolyzed with excess ice water containing 12.0 g. (0.2 mole) of glacial acetic acid. The organic phase is separated and the aqueous phase extracted with three 150-200 ml. portions of ether. The combined extracts are washed with dilute sodium bicarbonate solution and dried over sodium sulfate. Most of the solvent is evaporated in vauco and the resultant semi-crystalline mass crystallizes upon addition of hexane. The solid is filtered, washed with pet ether, and dried to yield α-cyclopentadienyl-α-phenylbenzyl alcohol; M.P. 119–123° C.

To 100 ml. of absolute ethanol is added 12.4 g. (0.05 mole) of α-cyclopentadienyl-α-phenylbenzyl alcohol and 9.2 g. (0.05 mole) of di-2-pyridyl ketone. The resulting solution is cooled to −5° C. and 20 ml. of absolute ethanol containing 0.115 g. (0.005 g. atom) of dissolved sodium is added. After stirring for about two hours, the crystalline product (isomeric mixture) is filtered, washed with ethanol, washed with acetone and then dried; M.P. 142–149° C. From nuclear magnetic resonance (NMR) spectroscopy, the product is found to be predominantly composed of the 1,4-isomer, 1-(diphenyl-hydroxy-methyl)-4-(di-2-pyridyl - hydroxy - methyl) - cyclopenta-1,3-diene, and the corresponding 1,3-isomers.

EXAMPLE XI

A solution of 12.97 g. (0.03 mole) of the product obtained from Example X and 3.91 g. (0.04 mole) of maleimide in 200 ml. of benzene is refluxed for 2 days. From the hot solution, a small amount of white solid separates. Filtration and recrystallization from chloroform-acetone-methanol yields 1.5 g. (9.4%) of pure product, 1-(α-hydroxydiphenylmethyl)-4-(α-hydroxy-α,α-di - 2 - pyridylmethyl)-5-norbornene-2,3-dicarboximide; M.P. 231–232° C. (dec.).

The solvent is evaporated from the above filtrate in vacuo. Repeated fractional recrystallization of the more soluble fractions in methanol-water yields about 5.5 g. (34.4%) of a mixture containing the 1,5-isomers, as determined by NMR; M.P. 187–215° C.

*Analysis.*—Calcd. for: $C_{33}H_{27}N_3O_4$ (529.57): C, 74.84; H, 5.14; N, 7.94%. Found: C, 74.58; H, 5.39; N, 7.81%.

EXAMPLE XII

To 100 ml. of absolute ethanol is added 12.4 g. (0.05 mole) of α-cyclopentadienyl-α-phenylbenzyl alcohol and 9.2 g. (0.05 mole) of 2-pyridyl-4-pyridyl ketone. The resulting solution is cooled to −5° C. and 20 mol. of absolute ethanol containing 0.115 g. (0.005 g. atom) of dissolved sodium is added. Stirring at the above temperature for 2–3 hours gives the product as a mixture of isomers consisting mainly of the 1,4-isomer, 1-(diphenyl-hydroxy-methyl)-4-[(2-pyridyl-4-pyridyl)-hydroxymethyl] - cyclopenta-1,3-diene, and the corresponding 1,3-isomers. Condensation with maleimide according to the procedure of Example II with subsequent separation of the product as shown therein yields, a product composed of 1-(diphenyl-hydroxymethyl)-4-[2-pyridyl - 4 - pyridyl)-hydroxymethyl]-5-norbornene-2,3-dicarboximide and the corresponding 1,5-isomers.

EXAMPLE XIII

To 100 ml. of absolute ethanol is added 12.5 g. (0.05 mole) of α-cyclopentadienyl-α-phenylbenzyl alcohol and 10.6 g. (0.05 mole) of 6,6′-dimethyl-di-2-pyridyl ketone. The resulting solution is cooled to −5° C. and 20 ml. of absolute ethanol containing 0.115 g. (0.005 g. atom) of dissolved sodium is added. Stirring at this temperature for about two hours gives the product as a mixture of isomers consisting mainly of the 1,4-isomer, 1-(diphenyl-hydroxy-methyl)-4-[di-(6-methyl - 2 - pyridyl) - hydroxymethyl]-cyclopenta-1,3-diene, and the corresponding 1,3-isomers. Condensation with maleimide according to the procedure of Example II with subsequent separation of the product as shown therein yields a product composed of 1-(diphenyl-hydroxymethyl)-dicarboximide and the corresponding 1,5-isomers.

EXAMPLE XIV

A solution of 12.4 g. (0.05 mole) of α-cyclopentadienyl-α-phenylbenzyl alcohol and 2-benzoylpyridine in 100 ml. of absolute ethanol is cooled to −15° C. Five milliliters of ethanol containing 0.058 g. (0.0025 g.-atom) of dissolved sodium is then added with stirring. The mixture is stored for two days at −15° C. without stirring after which time the sodium ethoxide is neutralized by addition of 0.15 g. (0.0025 mole) of glacial acetic acid. A crop of orange crystals is filtered (suction) off and discarded. The mother liquors, after solvent removal in vacuo and redissolving of the residue in methanol, yields after several days standing about 2.5 g. (11.5%) of an off-white solid. Recrystallization from chloroform gives the product, a mixture of the 1,4-isomer, 1-(diphenyl-hydroxymethyl) - 4 - (phenyl - 2 - pyridylhydroxymethyl)-cyclopenta-1,3-diene, and the corresponding 1,3-isomers as a white solid, M.P. 163–164° C. (dec.).

EXAMPLE XV

A benzene suspension of 4.32 g. (0.01 mole) of the product obtained from Example XIV and 1.94 g. (0.02 mole) of maleimide is stirred at room temperature for 4 days. Solvent removal in vacuo yields a residue containing 1 - (diphenylhydroxymethyl) - 4 - (phenyl - 2-pyridyl-hydroxymethyl)-5 - norbornene - 2,3 - dicarboximide and the corresponding 1,5-isomers.

EXAMPLE XVI

A benzene suspension of 4.32 g. (0.01 mole) of the product obtained from Example XIV and 2.5 g. (0.02 mole) of N-ethyl maleimide is stirred at room temperature for 4 days. Solvent removal in vacuo yields a residue which upon treatment with methanol affords colorless crystals containing N-ethyl - 1 - (diphenylhydroxymethyl)-4 - (phenyl - 2 - pyridyl - hydroxymethyl) - 5-norbornene-2,3-dicarboximide and the corresponding N-ethyl derivatives of the 1,5-isomers, which after recrystallization from acetone gives a melting point of 208°–215° C.

What is claimed is:
1. A chemical compound selected from the group consisting of 1-R′-4-R″-N-R-5 - norbornene - 2,3-dicarboximide, 1 - R′ - 5 - R″ - N - R - 5 - norbornene-2,3-dicar- boximide and 1-R''-5-R'-N-R-5-norbornene-2,3-dicarboximide wherein R is a member selected from the group consisting of hydrogen and lower alkyl; R' is $R_1$-$R_2$-hydroxymethyl and R'' is $R_3$-$R_4$-hydroxymethyl, each of said $R_1$, $R_2$, $R_3$ and $R_4$ being a member selected from the group consisting of phenyl, pyridyl and lower alkylpyridyl, provided that at least one is other than phenyl.

2. Claim 1 wherein R' and R'' is di-(2-pyridyl)-hydroxymethyl.

3. Claim 1 wherein R' and R'' is di-(2-pyridyl)-hydroxymethyl and R is lower alkyl.

4. Claim 1 wherein R' and R'' is di-(6-methyl-2-pyridyl)-hydroxymethyl.

5. Claim 1 wherein R' and R'' is di-(6-methyl-2-pyridyl)-hydroxymethyl and R is lower alkyl.

6. Claim 1 wherein one of said R' and R'' is di-phenyl-hydroxymethyl and the other is di-(2-pyridyl)-hydroxymethyl.

7. Claim 1 wherein one of said R' and R'' is di-phenyl-hydroxymethyl and the other is phenyl-2-pyridyl-hydroxymethyl.

References Cited

UNITED STATES PATENTS 3,264,312    8/1966    Stevenson et al. _____ 260—295

HENRY R. JILES, *Primary Examiner.*

ALAN L. ROTMAN, *Assistant Examiner.*

U.S. Cl. X.R.

167—65; 260—287, 288, 289, 295.5, 296, 297, 591

UNITED STATES PATENT OFFICE
CERTIFICATE OF CORRECTION

Patent No. 3,436,396                      April 1, 1969

Joseph Albert Meschino et al.

It is certified that error appears in the above identified patent and that said Letters Patent are hereby corrected as shown below:

In the heading to the printed specification, line 11, "July 6, 1966" should read -- July 8, 1966 --. Column 1, lines 30 to 38, formula (IIa) should appear as shown below:

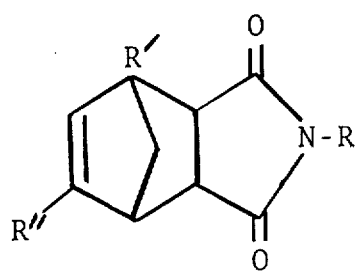

same column 1, lines 64 and 65, "respectivey" should read -- respectively --. Column 2, line 32, "cyclouentadienyl" should read -- cyclopentadienyl --. Column 3, line 71, after "di-", first occurrence, insert -- 2- --. Column 4, line 15, before "norbornene" insert -- 5- --; line 18, before "2" insert -- di- --. Column 5, line 31, "addition" should read -- additional --. Column 6, line 3, "mol" should read -- ml --; line 18, "12.5" should read -- 12.4 --.

Signed and sealed this 7th day of April 1970.

(SEAL)
Attest:

EDWARD M. FLETCHER, JR.               WILLIAM E. SCHUYLER, JR.
Attesting Officer                          Commissioner of Patents